2,440,625

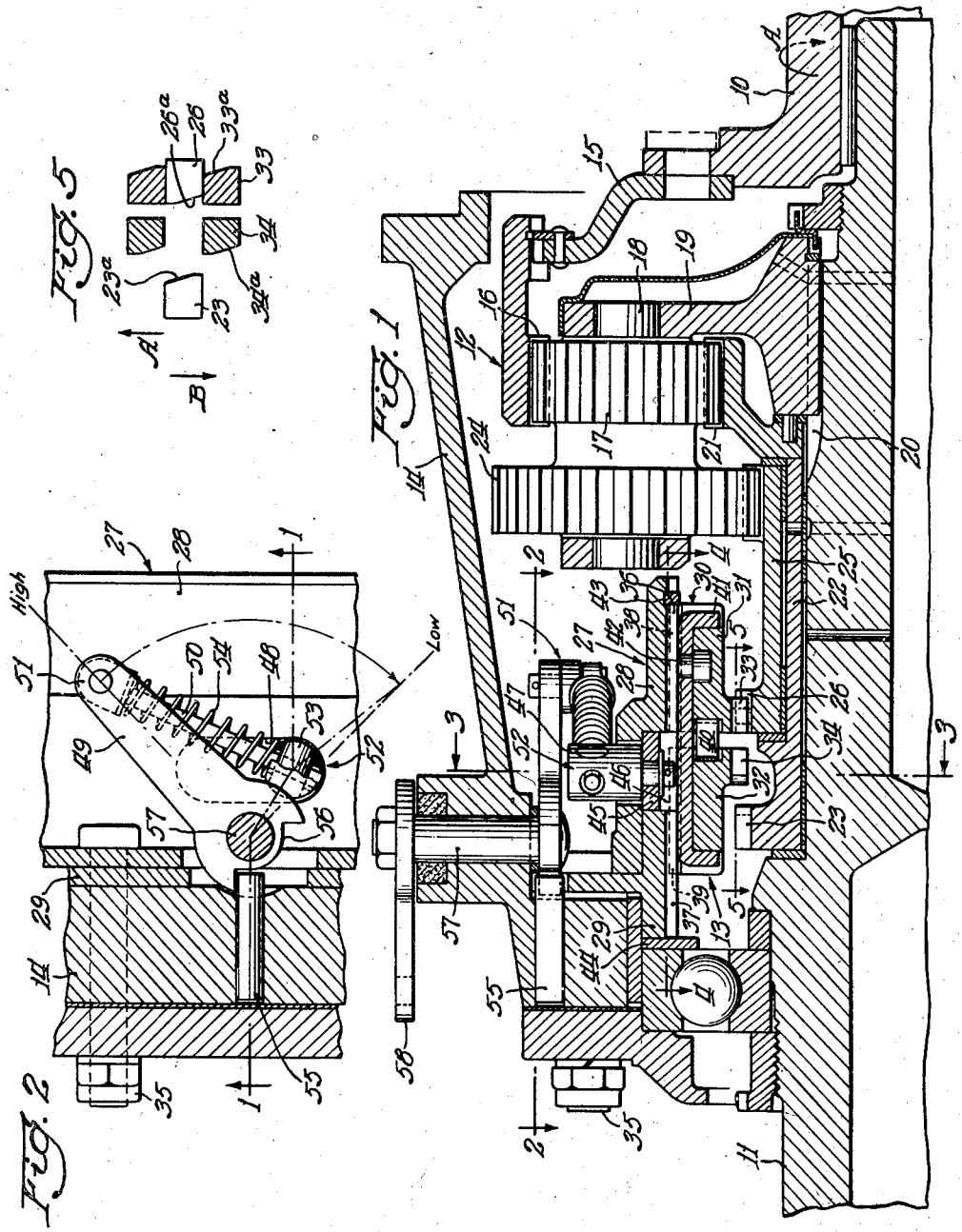

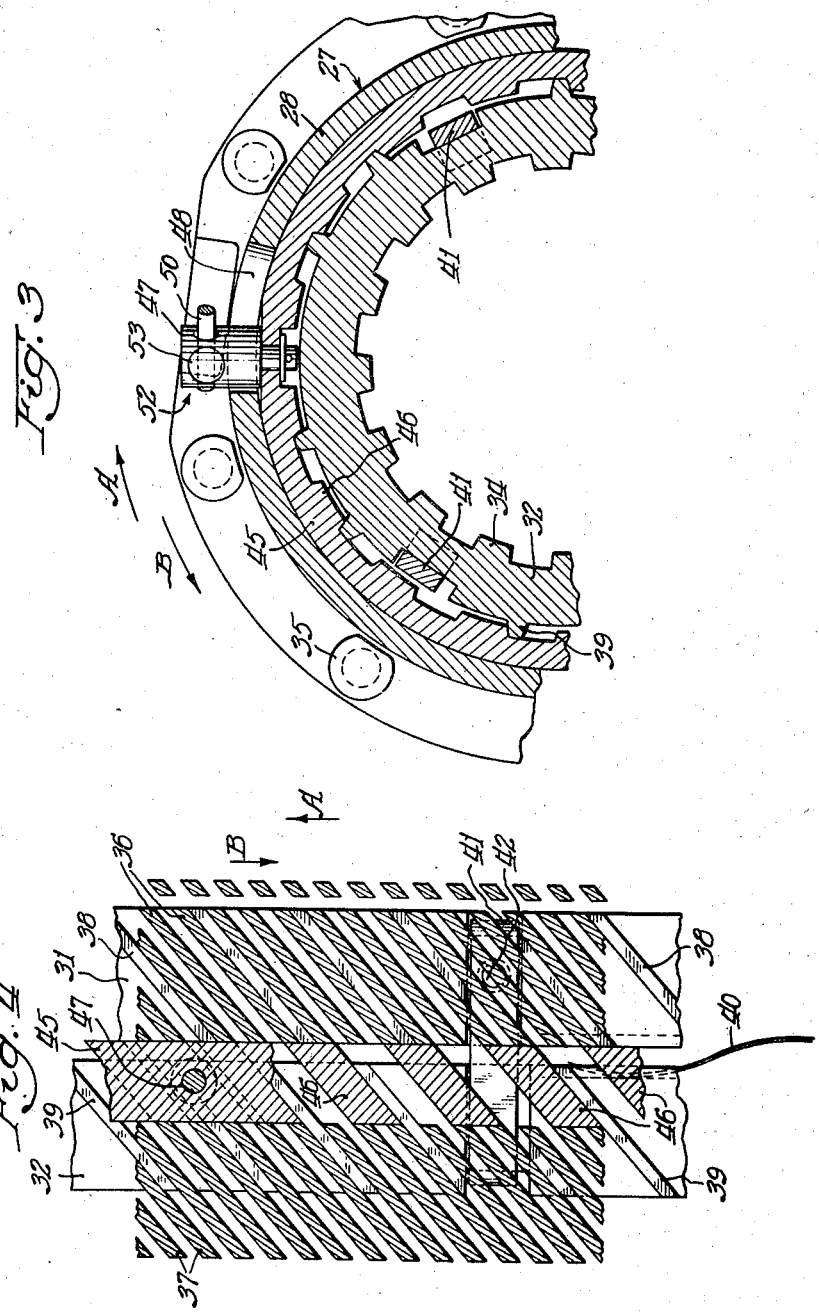
April 27, 1948.  H. C. WIEMER  2,440,625
TRANSMISSION
Filed Oct. 21, 1944  2 Sheets-Sheet 2
Inventor:
Howard C. Wiemer Patented Apr. 27, 1948

UNITED STATES PATENT OFFICE 2,440,625

TRANSMISSION

Howard C. Wiemer, Muncie, Ind., assignor to Borg-Warner Corporation, Chicago, Ill., a corporation of Illinois Application October 21, 1944, Serial No. 559,804

13 Claims. (Cl. 74—275)

My invention relates to transmissions and more particularly to coupling mechanisms in transmission.

In a copending application of Palmer Orr and Carl J. Conkle, Serial No. 488,185, filed May 24, 1943, now Patent #2,414,388, January 14, 1947, there is described a two speed transmission having a self-shifting coupling for conditioning the transmission to drive in either one speed ratio or in the other. The self-shifting coupling comprises an element shiftable under the influence of torque applied to the element into either of two positions which correspond to the two speed ratios and a locking mechanism for holding the shiftable element in either of its positions. The locking mechanism includes a ball adapted to fit in appropriate grooves in the shiftable element and a ring having a cam for holding the ball in the grooves. This locking mechanism has been found successful where the power transmitted through the transmission is small and where there is a steady application of load and driving torque; however, where there is shock loading and torsional vibration applied to the transmission as is commonly the case in aircraft installations, it has been found that this ball locking mechanism functions satisfactorily for only relatively short periods of time, due to the fact that only the curved surfaces of the ball are effective for stopping movement of the shiftable member.

It is an object of my invention to provide an improved coupling construction which is satisfactory for transmission installations which are shock loaded and have torsional vibrations applied thereto, as, for example, transmissions for aircraft.

More particularly it is an object of my invention to provide improved locking mechanism of this type in which flat surfaces, as contrasted with curved surfaces, are used as abutments for locking a shiftable element in place.

Still more particularly it is an object of my invention to provide an oscillatable blocker having flat surfaces which cooperate with flat surfaces on a shiftable element to lock the element from movement when so desired.

The invention consists of the novel constructions, arrangements, and devices to be hereinafter described and claimed for carrying out the above stated objects and such other objects as will appear from the following description of a certain preferred embodiment illustrated in the accompanying drawings, wherein:

Fig. 1 is a longitudinal sectional view of a transmission embodying the principles of the invention and taken along line 1—1 of Fig. 2;

Fig. 2 is a sectional view taken on line 2—2 of Fig. 1;

Fig. 3 is a sectional view taken on line 3—3 of Fig. 1;

Fig. 4 is a developed sectional view taken on line 4—4 of Fig. 1; and

Fig. 5 is a sectional view taken on line 5—5 of Fig. 1.

Like characters of reference designate like parts in the several views.

My invention is described particularly with reference to a transmission for airplanes which is shown in the accompanying drawings. The illustrated transmission comprises a drive shaft 10 which may be connected directly to the engine or other source of power (not shown), a driven shaft 11 adapted to be connected to a propeller (not shown), a double reduction planetary gear set 12 adapted to provide a reduced drive between drive shaft 10 and driven shaft 11 and a coupling device 13 for effecting the changes in ratio through gear set 12. The entire mechanism is enclosed in a housing 14 which may be mounted between the propeller and engine.

The gearing comprises a drive plate 15 secured to the drive shaft 10 and driving a ring gear 16. The ring gear 16 meshes with and drives one or more planet pinion gears 17 which are the smaller of pairs of gears formed integrally as a spool and mounted to rotate about pinion shafts 18. A carrier 19 supports pinion shafts 18 and is mounted on and drives splines 20 in driven shaft 11. The planet pinions 17 mesh with a sun gear 21 drivingly associated with a sleeve 22 at an end of the latter. The sleeve 22 is rotatably mounted on the driven shaft 11 and is formed with teeth 23 at its opposite end as shown so that the sleeve may function as a reaction member, as will be described.

The larger of the pairs of pinion gears is shown at 24, and the larger pinion gears mesh with a sun gear 25. The sun gear 25 is rotatably supported on the sleeve 22 and is formed with teeth 26 as shown, so that the sun gear also may function as a reaction member as will be described.

The coupling 13 comprises a stationary member 27 which is made up of two portions 28 and 29. A coupling element 30 which comprises two portions 31 and 32 and which is helically splined to the stationary member 27 is disposed between the member 27 and the reaction members 22 and 25 of the gear set 12. The portions 31 and 32 of the coupling element are provided with teeth 33 and 34 respectively, and the coupling element 30 is shiftable so that the teeth 33 may mesh with the teeth 26 of the reaction member 25 and the teeth 34 may mesh with the teeth 23 of the reaction member 22. The coupling element 30 when meshing with the teeth 26 functions to hold the reaction member 25 stationary, and the gear set 12 is of such construction that a high speed drive, which is, however, of less than one to one ratio, is provided from the shaft 10 to the shaft 11. The coupling element 30 when engaging with the teeth 23 functions to hold the reaction member 22 stationary, and the gear set 12 under this condition provides a low speed ratio from the drive shaft 10 to the driven shaft 11.

The portions 28 and 29 of the stationary member 27 may be fixed with respect to the housing 14 by any suitable means, as by means of bolts 35. The portion 28 is provided with helical splines 36 and the portion 29 is provided with helical splines 37 (see Fig. 4). As will be noted from the drawings, the splines 36 and 37 extend in the same direction and in effect form continuations of each other, so that the portions 28 and 29 function as a single member.

The coupling element portions 31 and 32 are provided with helical splines 38 and 39 respectively, and as will be noted, these splines extend in the same direction and interengage with the splines 36 and 37 of the portions 28 and 29. The coupling element portions 31 and 32 are movable toward each other, and a spring 40 is disposed between them for yieldingly maintaining the portions apart. A plurality of retainer yokes 41 are disposed about the outer periphery of the coupling portions 31 and 32 in appropriate slots provided in the portions, and these yokes function to limit the movement of the portions away from each other. The yokes 41 are preferably fixed with respect to one of the portions 31 as by means of pins 42. The coupling element 30 moves longitudinally of the transmission, as will be hereinafter described, with the splines 38 and 39 moving between the splines 36 and 37, and an abutment ring 43 is provided at one end of the stationary member 27 and an abutment ring 44 is provided at the other end of the member 27 for limiting movement of the coupling element 30 in both directions.

Referring to Fig. 5, it will be observed that the teeth 26 have beveled ends 26a; the teeth 23 have beveled ends 23a; the teeth 33 have beveled ends 33a; and the teeth 34 have beveled ends 34a. The beveled ends of these teeth cooperate with the spring 40 moving the coupling element portions 31 and 32 apart to assure that the coupling 13 is never in a complete neutral condition and that similarly the transmission is never in a complete neutral condition, all as will be hereinafter fully described.

A blocker 45 is provided for blocking movement of the coupling element portions 31 and 32. The blocker is in the form of an annular ring disposed in a suitable groove within the stationary member 27 and between its portions 28 and 29, as shown. The blocker is provided with helical splines 46 on its inner periphery, and these splines are less in width than the distance between adjacent splines 38 or adjacent splines 39, as is apparent from Figs. 3 and 4. The blocker 45 thus may have limited oscillatable movement with respect to the coupling element portions 31 and 32.

A shifting mechanism is provided for the blocker 45, and this mechanism comprises a stud 47 swiveled and connected to the blocker and extending outwardly thereof through a suitable slot 48 provided in the stationary portion 28. The stud 47 is connected with a rock arm 49 by means of a shift rod 50. The rod 50 at one end has a pivotal connection 51 with the rock arm 49, and the rod 50 at its other end has a universal connection 52 with the stud 47. The connection 52 may be of any suitable type, such as one utilizing a round bar 53 rotatably disposed in a suitable cavity within the stud and through which the rod 50 extends and is slidably disposed. A spring 54 is disposed about the rod 50 and functions to yieldingly maintain the rod at an outer limit of its movement with respect to the universal connection 52. The movement of the rock arm 49 is limited by means of a pin 55 fixed within the housing 14 and extending into a suitable slot 56 of the rock arm. The rock arm 49 is connected by means of a shaft 57 with a shift lever 58 on the outside of the housing 14 which is utilized for conditioning the transmission for either its high or its low ratio, as will be described.

The operation of the transmission including its coupling 13 is as follows: The drive shaft 10 is driven by the attached motor (not shown) in a clockwise direction as viewed from the motor end of the transmission or as seen in Fig. 3 and as is designated by the arrows A in Figs. 1 and 3. With the condition of the coupling 13 as shown, in which the teeth 33 of the coupling element 30 are in engagement with the teeth 26 of the reaction member 25 of the gearing, the high speed power train is completed through the transmission. The reaction on the coupling element 30 through the teeth 26 and 33 when the motor is driving is in a counterclockwise direction as viewed from the motor end of the unit, that is, in the direction indicated by the arrows B in the drawings. Such a reaction on the coupling element 30 and particularly on its portion 31 tends to move the element 30 toward the front end of the transmission or toward the left as seen in Fig. 1 with the splines 38 of the portion 31 sliding between the splines 36 of the stationary member 27. Such movement of the coupling element 30, is, however, prevented by the blocker 45, when the blocker is in its high speed position in which it is shown in the drawings. In this position of the blocker, its splines 46 are in the way of the splines 38 so that the portion 31 cannot move forwardly of the transmission. When the throttle of the driving motor is closed, the reaction on the coupling element 30 is in the opposite direction, that is, in a clockwise direction indicated by the arrows A, and the coupling element portion 31 tends to move rearwardly of the transmission. This movement is, however, prevented by the ring 43. When the blocker 45 is in its illustrated position, the teeth 26 and 33 thus remain engaged regardless of whether the motor is driving or a coast condition exists, and the transmision is locked in high speed ratio.

When it is desired to shift the transmission into its low speed ratio, the shift lever 58 is actuated to move rock arm 49 into its low speed position as is indicated in Fig. 2. Such movement of the rock arm 49 compresses the spring 54, and the link 50 travels through its universal connection 52 with the stud 47. The blocker 45 and its stud remain in their positions in which they are shown, since the reaction with the motor driving remains the same on the coupling element portion 31, and the splines 38 of the portion thrust against the splines 46 of the blocker and prevent movement of the blocker. After such movement of the shift lever 58, the operator momentarily closes the throttle to reduce the torque on the drive shaft 10, and this reduction of torque releases the thrust of the splines 38 on the blocker splines 46 and allows the spring 54 to move the blocker in a clockwise direction, as indicated by the arrows A in the drawings. The blocker splines 46 thus move against the splines 39 of the coupling element portion 32, which are in the annular groove provided in the stationary member 27 for the blocker, and unblock the splines 38 of the coupling element portion 31. Thereafter, on an opening of the throttle which increases the torque applied to the shaft 10, the reaction on the portion 31 in the counter-clockwise direction indicated by the arrows B causes the portion 31 to move forwardly of the transmission, with the splines 38 passing between the splines 36 of the stationary member 27. The teeth 33 thus move out of mesh with the teeth 26 to thereby break the high speed power train through the transmission.

While the high speed power train is completed through the transmission and until the speed of the shaft 10 has been raised sufficiently after the breakage of the high speed power train by disengagement of the teeth 33 and 26, the reaction member 22 and its teeth 23 rotate in the clockwise direction as indicated by the arrows A in the drawings. When the teeth 33 move out of mesh with the teeth 26, the teeth 34 move into contact with the teeth 23; however, due to the beveled tooth sides 23a and 34a of the teeth 23 and 34, the teeth 34 ratchet over and do not interengage with the teeth 23. In this condition of the coupling 13, the spring 40 is flexed, and neither the low nor the high speed power train is completed through the transmission. When the speed of the drive shaft is increased sufficiently so that the shafts 10 and 11 are rotating in substantially the low speed ratio with respect to each other, the reaction member 22 and its teeth 23 cease to rotate in the clockwise direction indicated by the arrows A and begin to rotate in the opposite direction indicated by the arrows B. On such reversal of direction of rotation, the teeth 34 cease ratcheting over the teeth 23 and slide into interengagement with the latter teeth. The low speed power train is thus completed through the transmission. When there is a drive in low speed ratio through the transmission, the reaction on the coupling element portion 32 is in the counter-clockwise direction indicated by the arrows B, and the splines 39 of the portion move through the splines 37 of the stationary member 27 to the limits of their movement forwardly of the transmission against the abutment plate 44.

With the transmission being in low speed ratio, when the splines 39 move to the forward limits of their movement against the abutment plate 44, the blocker 45 moves clockwise slightly as indicated by the arrows A until the blocker splines 46 contact the splines 38 of the coupling element portion 31 which now are in the annular blocker groove in the stationary member 27, and the blocker blocks movement of the splines 39 and of the portion 32 rearwardly of the transmission. The blocker 45 thus locks the transmission in low speed ratio.

When it is desired to shift from low speed ratio to high speed ratio, the shift lever 58 is moved accordingly to bring the rock arm 49 into its position as shown in Fig. 2. Such movement of the lever 58, by means of the rock arm 49, the spring 54 and the rod 50, functions to oscillate the blocker 45 in a counter-clockwise direction indicated by the arrows B to bring the splines 46 of the blocker into contact with the opposite sides of the splines 38 of the coupling element portion 31 which extend into the annular groove provided for the blocker. The splines 39 of the coupling element portion 32 are thus unblocked, and immediately upon a closure of the throttle for the engine to decrease the torque impressed on the drive shaft 10, the coupling element portion 32 moves to the rear of the transmission with its splines 39 sliding between the splines 37, due to the reaction on the reaction member 22 changing to the clockwise direction indicated by arrows A, to disengage the teeth 34 with the teeth 23. The low speed ratio power train through the transmission is thus broken.

While the low speed ratio is completed through the transmission and until the drive shaft 10 has decreased in speed to bring the ratio of the shafts 10 and 11 to the high speed ratio as determined by the gear set 12, the reaction member 25 and its teeth 26 are rotating in the counter-clockwise direction as indicated by the arrows B. The chamfered ends of the teeth 33a and 26a are effective when this condition exists to maintain the teeth 33 and 26 disengaged and to limit the rearward movement of the coupling element portion 31; however, when the speed of the shaft 10 decreases sufficiently so that the high speed ratio exists between the shaft 10 and 11, the reaction member 25 and its teeth 26 stop and begin to rotate in the opposite direction, that is, in the clockwise direction indicated by the arrows A. On such rotation, the teeth 33 move into interengagement with the teeth 26 to complete the high speed ratio through the transmission. With the throttle remaining closed, the reaction on the portion 31 remains in the clockwise direction so that the splines 38 are effective to move the coupling element portion 31 to engage with the abutment ring 43. When the splines 38 and the coupling element portion 31 thus move to their rearward limit of movement, the blocker element 45 under the action of the spring 54 oscillates slightly in the counter-clockwise direction indicated by arrows B so that its splines 46 move against the splines 39 and the blocker is in its original position in which it is shown in Fig. 4 to thereafter block movement of the coupling element portion 31 forwardly of the transmission. The throttle may thereafter be opened for driving the shaft 11 through the gearing 12 from the shaft 10. The thrust is then again on the splines 46, and a driving connection in high speed ratio is complete through the transmission.

The teeth 26, 33, 34, and 23 are beveled, as shown particularly in Fig. 5, to facilitate the shifting of the coupling mechanism and to assure that the transmission can never be in a complete neutral condition. The arrangement of the yokes 41, the coupling element portions 31 and 32 and the teeth 23 and 26 is such that either one or both of the sets of teeth 33 and 34 at all times contact with either one or both of the sets of teeth 23 and 26. When the coupling element 30 is in the exact center of its shifting movement, the beveled ends 33a and 34a are both in contact with the beveled ends 23a and 26a of the teeth 23 and 26, and the spring 40 maintains the teeth in ratcheting engagement. When the shafts 10 and 11 are rotating at a ratio in between the high and low speed ratios provided by the gearing 12, both sets of teeth 33 and 34 will ratchet on the sets of teeth 23 and 26. The speed of the shaft 11, however, cannot exceed its speed that would be provided by the high speed ratio of the gearing without a reversal in the direction of rotation of the reaction member 26 and engagement of the teeth 33 and 26, and the speed of the shaft 11 cannot decrease below the speed that would be provided by the gearing 12 in low speed ratio without a reversal in the direction of rotation of the reaction member 22 and engagement of the teeth 34 and 23. It will thus be apparent that, with this arrangement, the propeller and its shaft 11 is never at any time free of the shaft 10 and an engine connected therewith.

The blocker 45 advantageously presents the flat sides of its splines 46 to the splines 38 and 39 of the coupling element portions 31 and 32 for preventing movement of the portions 31 and 32 caused by the spiral splines 36 and 37 of the stationary member 27. This blocker construction is such as to take a high thrust thereon which permits high torque to be transmitted through the transmission, and it furthermore continues to function effectively for long periods of time with shock loading and torsional vibrations impressed on the drive and driven shafts, as would commonly be the case in aircraft installations.

I wish it to be understood that my invention is not to be limited to the specific constructions and arrangements shown and described, except only insofar as the claims may be so limited, and it will be apparent to those skilled in the art that changes may be made without departing from the principles of the invention.

I claim:

1. In power transmission mechanism, the combination of two relatively rotatable members and means for coupling said members together, said means comprising a coupling element effective between said members and adapted to be shifted in response to changes in relative direction of torque between the members, and an oscillatable blocker having blocking portions effective in one position to prevent uncoupling movement of the coupling element and in another position of the blocker to allow uncoupling movement of the coupling element.

2. In power transmission mechanism, the combination of two relatively rotatable members and means for coupling said members together, said means comprising a coupling element between said members, teeth on said element and on one of said members for coupling the element and member together, said element being coupled to the other member so that it is shifted in response to changes in relative direction of torque between said members and transmitted through said teeth, and an oscillatable blocker having blocking portions effective in one position of the blocker to prevent shifting movement of said coupling element to maintain said teeth in engagement, said blocker in another position allowing shifting of the shiftable element to disengage said teeth.

3. In power transmission mechanism, the combination of two relatively rotatable members and means for coupling said members together, said means comprising a coupling element between said members, teeth on said element and on one of said members to couple the element and member together, said element being spirally splined to the other of said members and being thereby adapted to be shifted in response to changes in relative direction of torque between said members and impressed on said element through said teeth, and an oscillatable blocker having blocking portions effective in one position of the blocker to prevent shifting movement of said coupling element to maintain said teeth in engagement, said blocker in another position thereof allowing shifting of said element to disengage said teeth.

4. In power transmission mechanism, the combination of two relatively rotatable members and means for coupling said members together, said means comprising a coupling element between said members, teeth on said element and on one of said members to couple the element and member together, said element being spirally splined to the other of said members and being thereby adapted to be shifted in response to changes in relative direction of torque between said members and impressed on said element through said teeth, and an oscillatable blocker having blocking portions effective in one position of the blocker to prevent shifting movement of the coupling element to maintain said teeth in engagement, said blocker allowing shifting of the shiftable element in another position of the blocker to disengage said teeth, a blocker control lever, and a spring biasing means for biasing the blocker in one or the other of its said positions depending on the position of said lever.

5. In power transmission mechanism, the combination of three relatively rotatable members and means for coupling either a first or second of said members to the third of said members, said means including a coupling element effective between said third member and the others of said members, said coupling element being adapted to be shifted in response to changes in relative direction of torque between said third member and the others of said members to bring the coupling element into engagement with either of said first or second members, and an oscillatable blocker having blocking portions effective, depending on the position of the blocker, to prevent shifting movement of said coupling element in either of its positions in which it is coupled with said first or second members.

6. In power transmission mechanism, the combination of three relatively rotatable members and means for coupling either a first or second of said members to the third of said members, said means including a coupling element, teeth on said coupling element, teeth on each of said first and second members adapted to mesh with the teeth on said element depending on the position of the coupling element, said element being adapted to be shifted in response to changes in relative direction of torque between either said first or second member and said third member and transmitted through said teeth, and an oscillatable blocker having blocking portions effective, depending on the position of the blocker, to prevent shifting movement of said coupling element out of either of its positions in which its teeth are engaged with the teeth of either the first or second of said members.

7. In power transmission mechanism, the combination of three relatively rotatable members and means for coupling either a first or second of said members to the third of said members, said means including a coupling element, teeth on said coupling element, teeth on each of said first and second members adapted to mesh with the teeth on the coupling element to thereby couple the element with either of said members, helical splines on said coupling element and on said third member and interengaging whereby the coupling element is adapted to be shifted in response to changes in relative direction of torque between said third member and the other members transmitted through said teeth, and an oscillatable blocker having blocking portions effective to prevent shifting movement of said coupling element out of either of its positions in which its teeth are engaged with the teeth of said first or second members depending on the position of the blocker.

8. In power transmission mechanism, the combination of three relatively rotatable members and means for coupling either a first or second of said members to the third of said members, said means including a coupling element, said element comprising two portions movable toward and away from each other and a spring for yieldingly holding the portions apart, teeth on each of said portions, teeth on each of said first and second members adapted to mesh with the teeth on one of said portions to thereby couple the coupling element with either of said members, all of said teeth being beveled in the same direction and said spring holding said portions such a distance apart that the teeth on at least one of the portions are always in contact with the teeth on one of said first and second members, means coupling said coupling element with said third member and including helical splines on said portions and helical splines on said third member interengaged therewith whereby the coupling element is shifted in response to changes in relative direction of torque between said third member and the other members and transmitted through said teeth to engage one or the other of said sets of teeth on the element with corresponding teeth on said first or second members, and an oscillatable blocker having blocking portions effective on the splines of said coupling element portions to prevent shifting movement of either of the latter portions out of its tooth engaged position depending on the oscillated position of said blocker, a shifting lever for oscillating the blocker, and spring biasing means for yieldingly holding the blocker in either of its oscillated positions.

9. In power transmission mechanism, the combination of a driving element, a driven element, and means for completing two power trains of different speed ratios between said elements and including two different reaction members and gearing for driving said driven element at two different speeds in the same direction, a torque responsive brake for said two reaction members, said brake comprising a stationary member, a shiftable coupling element effective between said reaction members and said stationary member and adapted to couple either of the reaction members with said stationary member depending upon the position of said coupling element, said coupling element being adapted to be shifted in response to changes in the relative direction of torque between the reaction members and said stationary member, an oscillatable blocker having blocking portions effective to prevent shifting movement of said coupling element in one direction or the other depending upon the position of said blocker, and means for effecting a change in the position of said blocker to permit shifting of said coupling element by the reaction of said gearing on the reaction member then coupled with the coupling element upon a reversal of torque.

10. In power transmission mechanism, the combination of a driving element, a driven element, and means for completing two power trains of different speed ratios between said elements and including two different reaction members and gearing for driving said driven element at two different speeds in the same direction, a torque responsive brake for said two reaction members, said brake comprising a stationary member, a shiftable coupling element effective between said reaction members and said stationary member, teeth on said coupling element, teeth on each of said reaction members adapted to be engaged by the teeth on the coupling element for coupling said coupling element and reaction members together, said coupling element being adapted to be shifted relative to said stationary member in response to changes in the relative direction of torque applied to the coupling element through said teeth, whereby to disengage the teeth on one reaction member and engage the teeth on the other reaction member, an oscillatable blocker having blocking portions effective to prevent shifting movement of said coupling element out of either of its positions in which its teeth are engaged with the teeth of either of said reaction members depending upon the position of said blocker, and means for effecting a change in the position of said blocker to permit shifting of said coupling element by the reaction of said bearing on the reaction member then coupled with the coupling element upon a reversal of torque.

11. In power transmission mechanism, the combination of a driving element, a driven element, and means for completing two power trains of different speed ratios between said elements and including two different reaction members and gearing for driving said driven element at two different speeds in the same direction, a torque responsive brake for said two reaction members, said brake comprising a stationary member, a shiftable coupling element effective between said reaction members and said stationary member, teeth on said coupling element, teeth on each of said reaction members for interengaging with the teeth of the coupling element to couple the coupling element with either of said reaction members, interengaging helical splines on said coupling element and on said stationary member, whereby the coupling element is adapted to be shifted relative to said stationary member in response to changes in the relative direction of torque between either of the reaction members and the stationary member transmitted through said teeth, an oscillatable blocker having blocking portions effective on the splines of said coupling element to prevent shifting movement of said coupling element from either of its positions in which its teeth interengage with teeth of one of said reaction members, depending upon the position of the blocker, and means for effecting a change in the position of said blocker to permit shifting of said coupling element by the reaction of said gearing on the reaction member then coupled with the coupling element upon a reversal of torque.

12. In power transmission mechanism, the combination of a driving element, a driven element, and means for completing two power trains of different speed ratios between said elements and including two different reaction members and gearing for driving said driven element at two different speeds in the same direction, a torque responsive brake for said two reaction members, said brake comprising a stationary member, a shiftable coupling element effective between said reaction members and said stationary member, said coupling element comprising two portions movable toward and away from each other and a spring for holding the portions apart, teeth on each of said portions, teeth on each of said reaction members adapted to be engaged by the teeth on one of said coupling portions, helical splines on each of said coupling portions and on said stationary member and being in interengagement, whereby said coupling element is adapted to be shifted in response to changes in relative direction of torque between the reaction members and the stationary member, said teeth on the coupling element and on the reaction member having ends beveled in the same direction and said spring maintaining the coupling element portions apart so that the teeth of the latter portions are always in contact with the teeth of at least one of said reaction members, an oscillatable blocker having blocking portions effective on the splines of said coupling element portions to prevent shifting movement of either of the portions to disengage its teeth from those of the corresponding reaction member, depending on the position of the blocker, and means for effecting a change in the position of said blocker to permit shifting of said coupling element by the reaction of said gearing on the reaction member then coupled with the coupling element upon a reversal of torque.

13. In power transmission mechanism, the combination of a driving element, a driven element, and means for completing two power trains of different speed ratios between said elements and including two different reaction members and gearing for driving said driven element at two different speeds in the same direction, a torque responsive brake for said two different reaction members, said brake comprising a stationary member, a coupling element effective between said reaction members and said stationary member, said coupling element comprising two portions movable toward and away from each other and a spring yieldingly holding said portions apart, teeth on each of said coupling portions, teeth on each of said reaction members adapted to be interengaged by the teeth of one of said coupling portions, the teeth on said coupling portions and on said reaction members being beveled on their ends in the same direction and said spring holding the coupling element portions apart such a distance that the teeth on the coupling element are always in contact with the teeth on at least one of said reaction members, interengaged helical splines on said coupling portions and on said stationary member, whereby said coupling portions are shifted in response to changes in relative direction of torque impressed thereon through said teeth, an oscillatable blocker having blocking portions effective on the helical splines on said coupling portions to prevent shifting movement of either of said coupling portions to bring the teeth of the portion out of interengagement with the teeth of the corresponding reaction member depending on the position of the blocker, means including a shifting lever for oscillating said blocker to permit shifting of said coupling element by the reaction of said gearing on the reaction member then coupled with the coupling element upon a reversal of torque, and spring biasing means for holding the blocker in either of its blocking positions.

HOWARD C. WIEMER.

REFERENCES CITED

The following references are of record in the file of this patent:

UNITED STATES PATENTS

| Number | Name | Date |
| --- | --- | --- |
| 1,654,432 | Rowledge | Dec. 27, 1927 |
| 1,954,200 | Fromm | Apr. 10, 1934 |
| 2,068,776 | Syrony | Jan. 26, 1937 |
| 2,127,305 | Nabstedt | Aug. 16, 1938 |
| 2,248,133 | Snow | July 8, 1941 |
| 2,371,564 | Wemp | Mar. 13, 1945 |

FOREIGN PATENTS

| Number | Country | Date |
| --- | --- | --- |
| 460,149 | Great Britain | Jan. 19, 1937 |

Certificate of Correction

Patent No. 2,440,625.

April 27, 1948.

HOWARD C. WIEMER

It is hereby certified that errors appear in the printed specification of the above numbered patent requiring correction as follows: Column 6, line 34, for the word "shaft" read *shafts*; column 10, line 33, claim 10, for "bearing" read *gearing*; column 12, line 4, claim 13, for "of" after "teeth" read *on*; and that the said Letters Patent should be read with these corrections therein that the same may conform to the record of the case in the Patent Office.

Signed and sealed this 13th day of July, A. D. 1948.

[SEAL]

THOMAS F. MURPHY,
*Assistant Commissioner of Patents.*